March 13, 1951 D. FRIEND 2,545,406
BALL JOINT MOUNTING
Filed May 20, 1948

INVENTOR.
DAWSON FRIEND,
BY: Harold B. Hood.
ATTORNEY.

UNITED STATES PATENT OFFICE 2,545,406

BALL-JOINT MOUNTING

Dawson Friend, Connersville, Ind., assignor to Stant Manufacturing Company, Connersville, Ind., a corporation of Indiana Application May 20, 1948, Serial No. 28,161

4 Claims. (Cl. 287—21)

The present invention relates to a ball-joint mounting, and is particularly concerned with the provision of an improved ball and socket joint of such character as to support, upon a stem or equivalent element, a member of any desired characteristics for limited, and friction-resisted, universal movement relative thereto. The mounting of the present invention is adapted for use in supporting, for such movement, any kind of object; but it finds particular utility in connection with the mounting of a rear-view mirror for automobiles, and it has been so illustrated and will be so described.

Further objects of the invention will appear as the description proceeds. To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
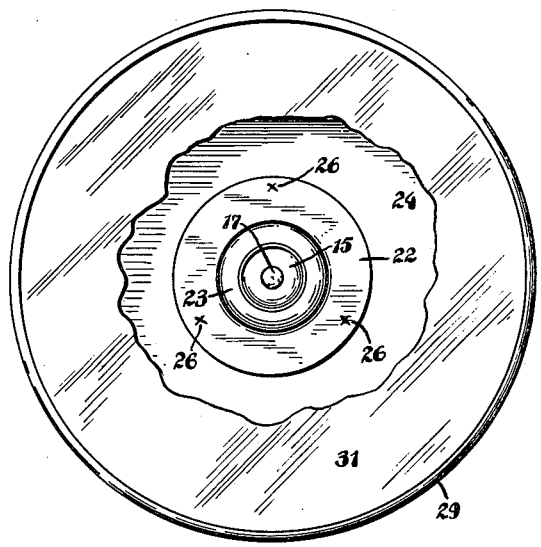
Fig. 1 is a front elevation of a rear-view mirror of conventional form, parts being broken away to show portions of my novel mounting.
Figure 2:
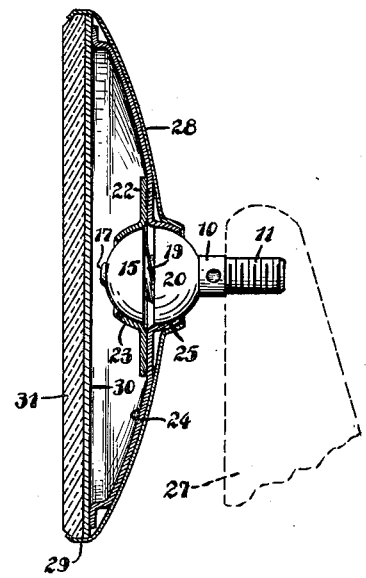
Fig. 2 is a vertical section therethrough, showing my ball units in elevation.
Figure 3:
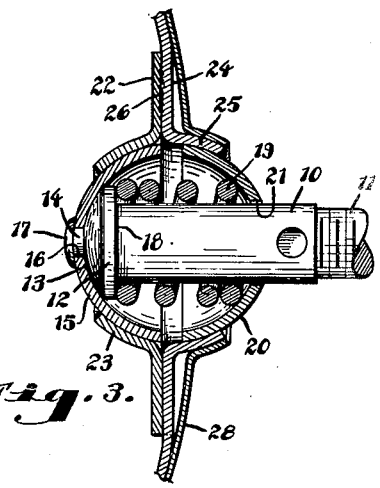
Fig. 3 is an enlarged vertical section through the ball and socket joint proper.

In Figs. 1 to 3, I have shown a stem 10 having a threaded shank 11 and provided, near one end, with a head or collar 12. That surface 13 of the head 12 nearest the adjacent extremity of the stem is preferably part spherical; and a reduced axial extension 14 projects beyond said head. At least the extension 14 of the stem is deformable, for a reason which will appear.

A substantially hemispheric element 15 is provided with a polar aperture 16 adapted to be sleeved snugly onto the extension 14; and it will be seen that the radius of the surface 13 is substantially equal to the internal radius of the element 15. Thus, when the extremity of the extension 14 is riveted over, as at 17, against the external surface of the element 15 sleeved thereon, the internal surface of said element 15 is frictionally pressed against the correspondingly partspherical surface 13, whereby the element 15 is firmly secured in place on the stem 10.

That surface 18 of the head 12 remote from the extension 14 is substantially normal to the axis of the stem 10; and a coiled spring 19 is sleeved on the stem 10 to bear, at one end, against said surface 18. A second substantially hemispheric element 20 is sleeved on the stem 10 to engage the opposite end of the spring 19; and said element 20, which is provided with a polar aperture 21, snugly engaging the stem 10, is pressed toward the element 15 to bring the equatorial regions of said two elements into proximity, as shown, thereby compressing the spring 19.

A plate 22 is provided with an aperture guarded by a concavo-convex flange 23, whose internal radius substantially corresponds to the external radius of the element 15. Said plate 22 is assembled in embracing relation with the equatorial region of the element 15, as is clearly shown in Fig. 3. Now, a second plate 24, likewise formed with an aperture guarded by a concavo-convex flange 25 whose internal radius substantially corresponds to the external radius of the element 20, is sleeved over the stem 10 into embracing relation with the equatorial region of the element 20, and said plate 24 is brought into facing engagement with the plate 22, thus to hold the elements 15 and 20 against separation, in a polar direction, under the influence of the spring 19. The plates 22 and 24 are now secured together in any suitable manner as by spot welding at a plurality of points 26 radially spaced beyond the apertures in said plates.

It will be seen that the plates 22 and 24 thus cooperate to provide an annular, part-spherical surface, spanning the equatorial regions of the two hemispheric elements 15 and 20, and limiting separating relative movement of said two elements in a polar direction. It will also be seen that, since said elements 15 and 20 are otherwise unrestrained against such polar separating relative movement, the spring 19 produces a relatively heavy frictional bearing of the elements 15 and 20 against the embracing surfaces of the flanges 23 and 25. Thus, the annular unit comprising the plates 22 and 24 may be moved universally about the center of the sphere defined by the elements 15 and 20, but such movement is resisted, by the friction existing between said elements and the flanges 23 and 25, and the degree of such friction may be predetermined in accordance with the relaxed length and the unit strength of the spring 19.

The element 24 may be the standard back plate of a rear-view mirror, for instance, and the threaded shank 11 of the stem 10 may be threadedly engaged in any suitable bracket such as the indicated at 27 in Fig. 2. In the illustrated embodiment of the invention, a shell 28 surrounds and encloses the back plate 24; and its periphery 29 will be crimped about a mirror assembly comprising a backing sheet or gasket 30 and a mirror proper 31.

Figure 4:
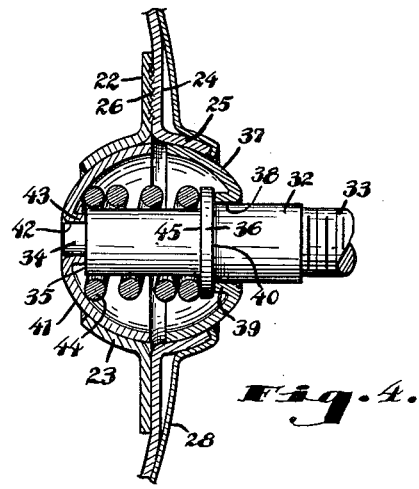
Fig. 4 is a view similar to Fig. 3, showing a modified form of joint assembly.

In Fig. 4, I have illustrated a stem 32 having a threaded shank 33 and a reduced extension 34 at its opposite end, said extension defining an outwardly-facing shoulder 35. At a point spaced from the extension 34, the stem 32 is provided with a radial flange or collar 36 which may be integral with the stem.

A substantially hemispheric element 37 is provided with a polar aperture 38 guarded by an inwardly-projecting, annular axial flange 39 adapted to be sleeved snugly on the stem 32 and to engage that surface 40 of the collar 36 which is remote from the projection 34. A second, mating, substantially hemispheric element 41 is provided with a polar aperture 42 guarded by an inwardly-extending, annular axial flange 43 which is adapted to be snugly sleeved on the extension 34 and to abut the shoulder 35. A coiled spring 44 is sleeved on the stem 32 with one end in abutment with that surface 45 of the collar 36 adjacent the extension 34, and its other end bearing against the internal surface of the element 41.

The plate 24 is mounted with its flange 25 in embracing engagement with the equatorial region of the element 37, and thereafter the plate 22 is arranged with its flange in embracing relation with the equatorial region of the element 41, and said plate 22 is forced into facing engagement with the plate 24, thereby compressing the spring 44, said plate 22 being thereupon secured to the plate 24 by any suitable means, such as spot welding 26. The organization illustrated in Fig. 4 will, of course, operate precisely in the manner described in connection with the organization illustrated in Figs. 1 to 3; but the form of my invention illustrated in Figs. 1 to 3 is somewhat more readily assembled than is that form illustrated in Fig. 4.

I claim as my invention:

1. The combination with a stem having a radially reduced portion at one end defining a shoulder and a radially projecting collar at a point spaced from said end, and a member to be mounted on said stem for limited universal adjustment relative thereto, of a substantially hemispheric element provided, substantially in its polar region, with an axially inwardly projecting flange having a bearing support on said reduced stem portion and adapted to abut said shoulder, a mating substantially hemispheric element provided, substantially in its polar region, with an axially inwardly projecting flange having a bearing support on said stem in a region more remote than said collar from said reduced stem end and adapted to abut said collar, a coiled spring sleeved on said stem between said collar and said reduced stem end and bearing against said collar and said first-named element, and confining means providing substantially annular, part-spherical surfaces engaging said elements adjacent their equatorial regions and confining said elements against excessive separation in a polar direction under the influence of said spring, said member being supported from said confining means.

2. In combination, a stem, a substantially hemispheric element centered on said stem, a mating substantially hemispheric element centered on said stem with its equatorial region adjacent the equatorial region of said first-named element and in substantial polar alignment with said first-named element, spring means urging separation of said elements in a polar direction, and means providing an annular, part-spherical surface embracing said elements and spanning the equatorial regions thereof, said last-named means limiting separation of said elements under the influence of said spring means, said spring means comprising a coiled spring sleeved on said stem, said stem being provided with a fixed collar abutted by one of said elements, and one end of said spring bearing upon said collar while the other end of said spring bears upon the other of said elements.

3. In combination, a stem provided, near one end, with a head and having a deformable axial extension beyond said head, a substantially hemispheric element having a substantially polar opening sleeved on said extension, the extremity of said extension being riveted over to secure said element in place on said stem, a second substantially hemispheric element having a substantially polar opening sleeved on said stem in facing relation to said first-named element, a coiled spring sleeved on said stem and bearing on that face of said head remote from said extension and cooperating with said second hemispheric element to urge the same in a polar direction away from said first-named element, and means providing an annular, part-spherical surface engaging said elements and spanning the equatorial regions thereof, said means limiting separation of said elements under the influence of said spring.

4. The combination of claim 3 in which that surface of said head remote from said extension is substantially normal to the axis of said stem, that surface of said head adjacent said extension is part-spherical upon a radius substantially equal to the internal radius of said first-named element, and said first-named element is frictionally pressed against said head surface when said extension extremity is riveted over.

DAWSON FRIEND.

REFERENCES CITED

The following references are of record in the file of this patent:

UNITED STATES PATENTS

| Number | Name | Date |
|---|---|---|
| 974,253 | Forg | Nov. 1, 1910 |
| 1,280,304 | Roberts | Oct. 1, 1918 |
| 2,000,172 | Hanson | May 7, 1935 |

FOREIGN PATENTS

| Number | Country | Date |
|---|---|---|
| 231,715 | Great Britain | Apr. 9, 1925 |